(12) United States Patent
Casino

(10) Patent No.: US 6,850,841 B1
(45) Date of Patent: Feb. 1, 2005

(54) METHOD AND SYSTEM FOR OBTAINING LANE DATA

(75) Inventor: Roy Casino, Mundelein, IL (US)

(73) Assignee: Navtech North American, LLC, Chicago, IL (US)

( * ) Notice: Subject to any disclaimer, the term of this patent is extended or adjusted under 35 U.S.C. 154(b) by 0 days.

(21) Appl. No.: 10/439,000

(22) Filed: May 15, 2003

(51) Int. Cl.[7] .............................................. G01C 21/30
(52) U.S. Cl. ................ 701/208; 340/995.1; 340/995.14
(58) Field of Search .............................. 701/200, 208, 701/213; 340/995.1, 995.14, 995.18, 995.28

(56) References Cited

U.S. PATENT DOCUMENTS

| | | | |
|---|---|---|---|
| 5,999,878 A | | 12/1999 | Hanson et al. ............... 701/208 |
| 6,047,234 A | | 4/2000 | Cherveny et al. ............ 701/200 |
| 6,173,231 B1 | * | 1/2001 | Chojnacki ................... 701/208 |
| 6,343,301 B1 | * | 1/2002 | Halt et al. ................... 707/203 |
| 6,366,851 B1 | | 4/2002 | Chojnacki et al. ........... 701/208 |
| 6,381,537 B1 | * | 4/2002 | Chenault et al. ............. 701/209 |
| 6,385,533 B1 | * | 5/2002 | Halt et al. ................... 701/207 |
| 6,385,539 B1 | | 5/2002 | Wilson et al. ............... 701/213 |
| 6,516,267 B1 | * | 2/2003 | Cherveny et al. ............ 701/208 |
| 6,526,352 B1 | | 2/2003 | Breed et al. ................. 701/213 |
| 6,564,144 B1 | * | 5/2003 | Cherveny .................... 701/208 |
| 6,640,187 B1 | * | 10/2003 | Chenault et al. ............. 701/209 |
| 6,687,612 B2 | * | 2/2004 | Cherveny .................... 701/208 |
| 2003/0125871 A1 | * | 7/2003 | Cherveny et al. ............ 701/208 |

* cited by examiner

Primary Examiner—Gary Chin
(74) Attorney, Agent, or Firm—Jon D. Shutter; Frank J. Kozak; Lawrence M. Kaplan

(57) ABSTRACT

A method for collecting data for a geographic database is disclosed. A plurality of vehicles moving on roads in a geographic region collects data indicating position of the vehicle. For a location on a selected road, the method obtains a cross sectional distribution of the position data. The method identifies a number of steps in the distribution indicating a number of lanes on the selected road and updates the geographic database with data indicating the number of lanes.

22 Claims, 13 Drawing Sheets

Relative Horizontal Location of Position Data Points (meters)

Relative Horizontal Location of Position Data Points (meters)

Relative Horizontal Location of Position Data Points (meters)

Relative Horizontal Location of Position Data Points (meters)

Relative Horizontal Location of Position Data Points (meters)

Relative Horizontal Location of Position Data Points (meters)

Relative Horizontal Location of Position Data Points (meters)

Relative Horizontal Location of Position Data Points (meters)

METHOD AND SYSTEM FOR OBTAINING LANE DATA

BACKGROUND OF THE INVENTION

The present invention relates to collecting geographic data for a geographic database and more particularly, the present invention relates to a method and system for collecting lane attribute information for a geographic database.

Geographic databases have various uses. Geographic databases are used in in-vehicle navigation systems, personal computers, networked computing environments, and various other kinds of platforms, as well as on the Internet. Geographic databases are used with various kinds of applications to provide various navigation-related and map-related functions including map display, route calculation, route guidance, driver assistance systems, truck fleet deployment, traffic control, traffic monitoring, electronic yellow pages, roadside assistance, emergency services, and so on.

In order to provide these kinds of functions, a geographic database includes data that represent geographic features in a region. The geographic features that are represented in a geographic database may include roads, intersections, and so on. A geographic database includes information about the represented geographic features, such as the geographic coordinates of roads in a geographic region, speed limits along the road segments, locations of stop lights, turn restrictions at intersections of roads, address ranges, street names, and so on.

Collecting information for a geographic database is a significant task. Not only is the initial collection of data a significant undertaking, but also a geographic database needs to be updated on a regular basis. For example, new streets are constructed, street names change, traffic signals are installed, and turn restrictions are added to existing roads. Also, new levels of detail may be added about geographic features that are already represented in an existing geographic database. For example, an existing geographic database for roads may be enhanced with information about lane widths, shoulder sizes, traffic signs, lane barriers, address ranges, sidewalks, bicycles paths, etc. Thus, there exists a need to continue to collect information for a geographic database.

One type of information that is useful to include in a geographic database is lane attribute information. Lane attribute information includes a number of lanes comprising a road segment, a lane width, and a lane centerline. One way to obtain lane attribute information is to physically measure each lane, such as with survey equipment. However, physical measurements are relatively expensive to perform and relatively time consuming. Another way to obtain lane attribute information is with a data collection vehicle. A company that produces geographic databases employs technicians (referred to as "researchers") to physically travel throughout assigned areas in specially equipped data collection vehicles to collect and record information about geographic features for inclusion in and updating of a master copy of a geographic database. One consideration of the using the data collection vehicle is that the equipment is relatively expensive and the collection process is relatively time consuming.

Accordingly, there exists a need for a relatively inexpensive way to determine lane attribute information.

SUMMARY OF THE INVENTION

To address these and other objectives, the present invention comprises a method and system for obtaining lane attribute data for a geographic database. A plurality of vehicles moving on roads in a geographic region collects data indicating position of the vehicle. The position data have accuracy worse than a width of a lane of the roads. For a location on a selected road, a cross sectional distribution of the position data is obtained. The cross sectional distribution is analyzed to identify lane attribute data. A number of steps in the distribution indicate a number of lanes on the selected road. A distance between adjacent steps indicates a lane width.

DETAILED DESCRIPTION OF THE PRESENTLY PREFERRED EMBODIMENTS

I. Geographic Database

Figure 1:
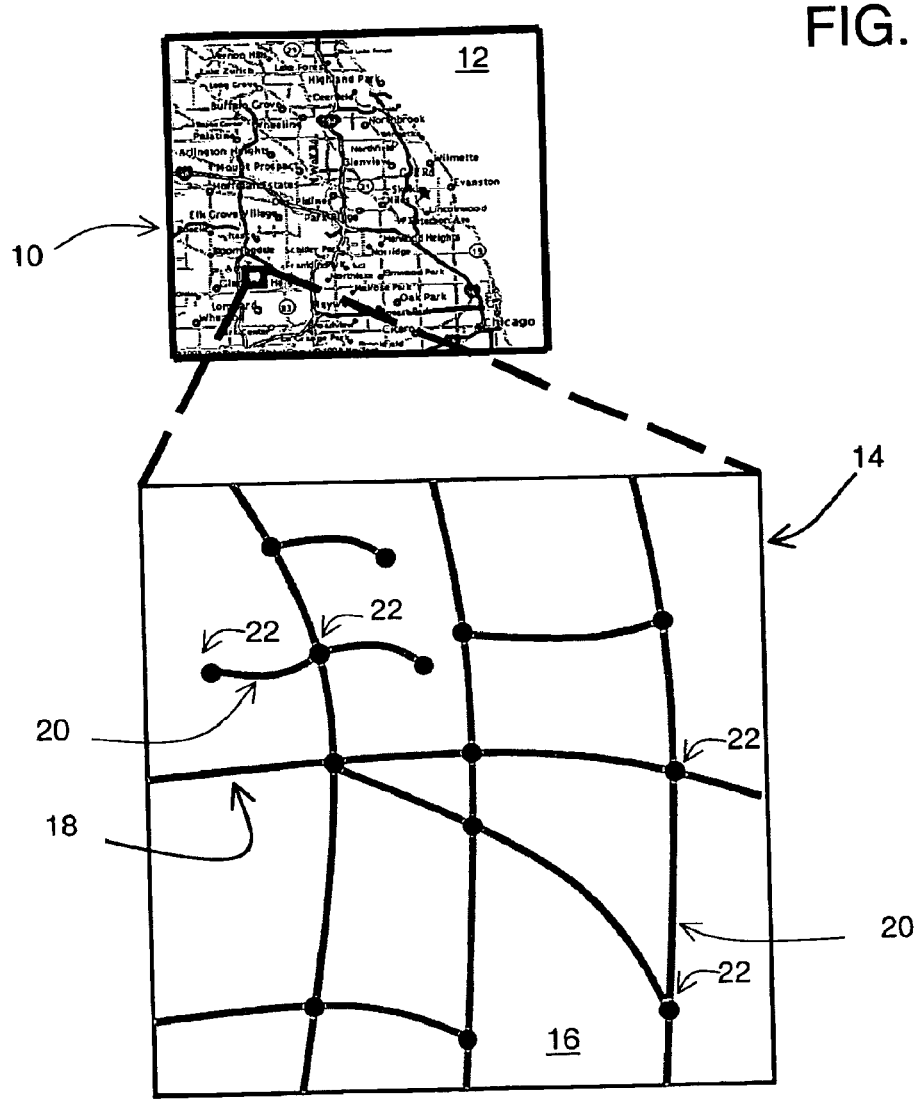
FIG. 1 shows a map of a geographic region.

FIG. 1 shows a map 10 of a geographic region 12. The geographic region 12 may correspond to a metropolitan or rural area, a state, a country, or combinations thereof, or any other area of comparable size. Located in the geographic region 12 are physical geographic features, such as roads, points of interest (including businesses, municipal facilities, etc.), lakes, rivers, railroads, municipalities, etc.

FIG. 1 also includes an enlarged map 14 of a portion 16 of the geographic region 12. The enlarged map 14 illustrates part of the road network 18 in the geographic region 12. The road network 18 includes, among other things, roads and intersections located in the geographic region 12. As shown in the portion 16, each road in the geographic region 12 is composed of one or more road segments 20. A road segment 20 represents a portion of the road. Each road segment 20 is shown to have associated with it two nodes 22; one node represents the point at one end of the road segment and the other node represents the point at the other end of the road segment. The node at either end of a road segment may correspond to a location at which the road meets another road, i.e., an intersection, or where the road dead-ends.

Figure 2:
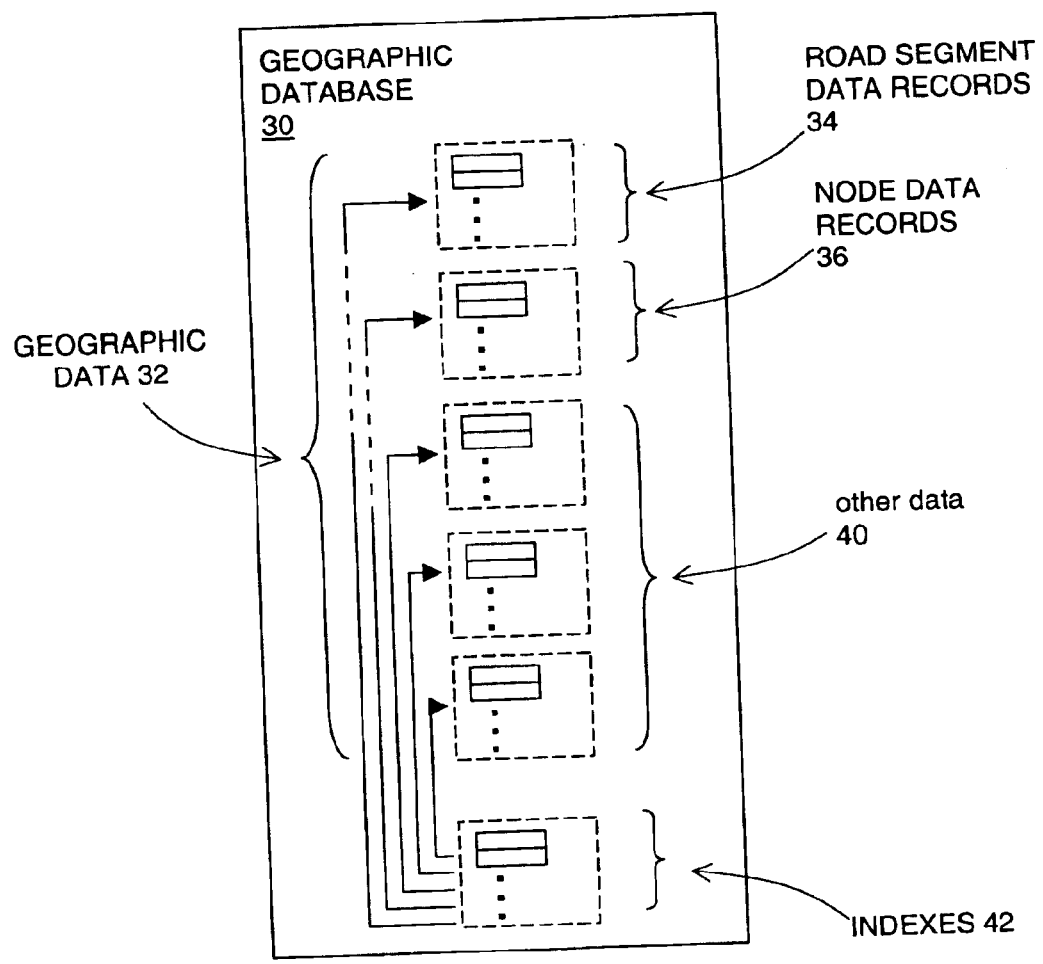
FIG. 2 is a block diagram of a geographic database that represents the geographic region of FIG. 1.

Referring to FIG. 2, a geographic database 30 contains data 32 that represent some of the physical geographic features in the geographic region (12 in FIG. 1). The data 32 contained in the geographic database 30 includes data that represent the road network 18. In the embodiment of FIG. 2, the geographic database 30 that represents the geographic region 12 contains at least one database record 34 (also referred to as "entity" or "entry") for each road segment 20 in the geographic region 12 in FIG. 1. The geographic database 30 that represents the geographic region 12 also includes a database record 36 (or "entity" or "entry") for each node 22 in the geographic region 12. (The terms "nodes" and "segments" represent only one terminology for describing these physical geographic features and other terminology for describing these features is intended to be encompassed within the scope of these concepts.)

The geographic database 30 may also include other kinds of data 40. The other kinds of data 40 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The geographic database 30 also includes indexes 42. The indexes 42 may include various types of indexes that relate the different types of data to each other or that relate to other aspects of the data contained in the geographic database 30.

Figure 3:
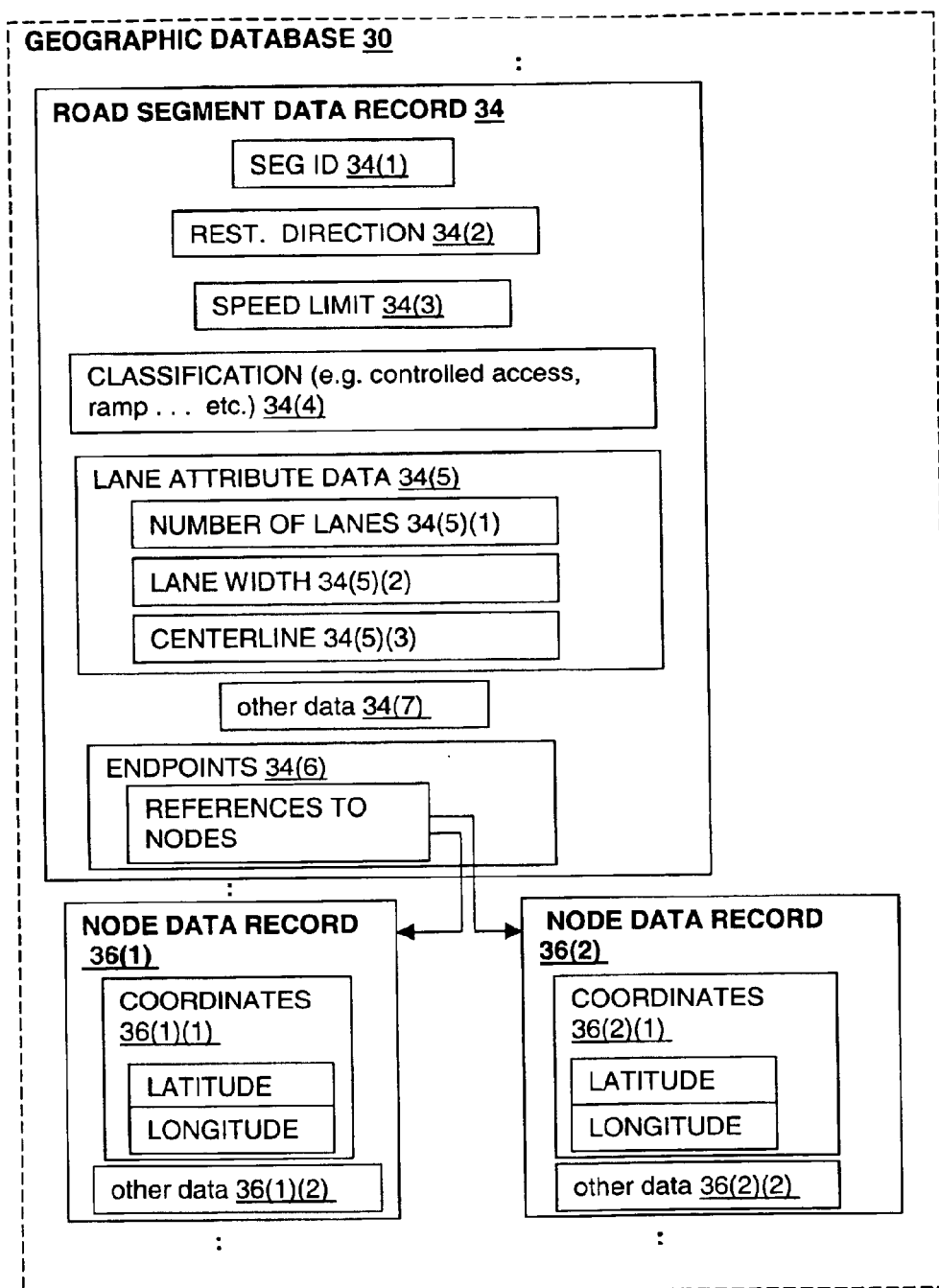
FIG. 3 is a block diagram showing a road segment data record contained in the geographic database of FIG. 2.
Figure 4:
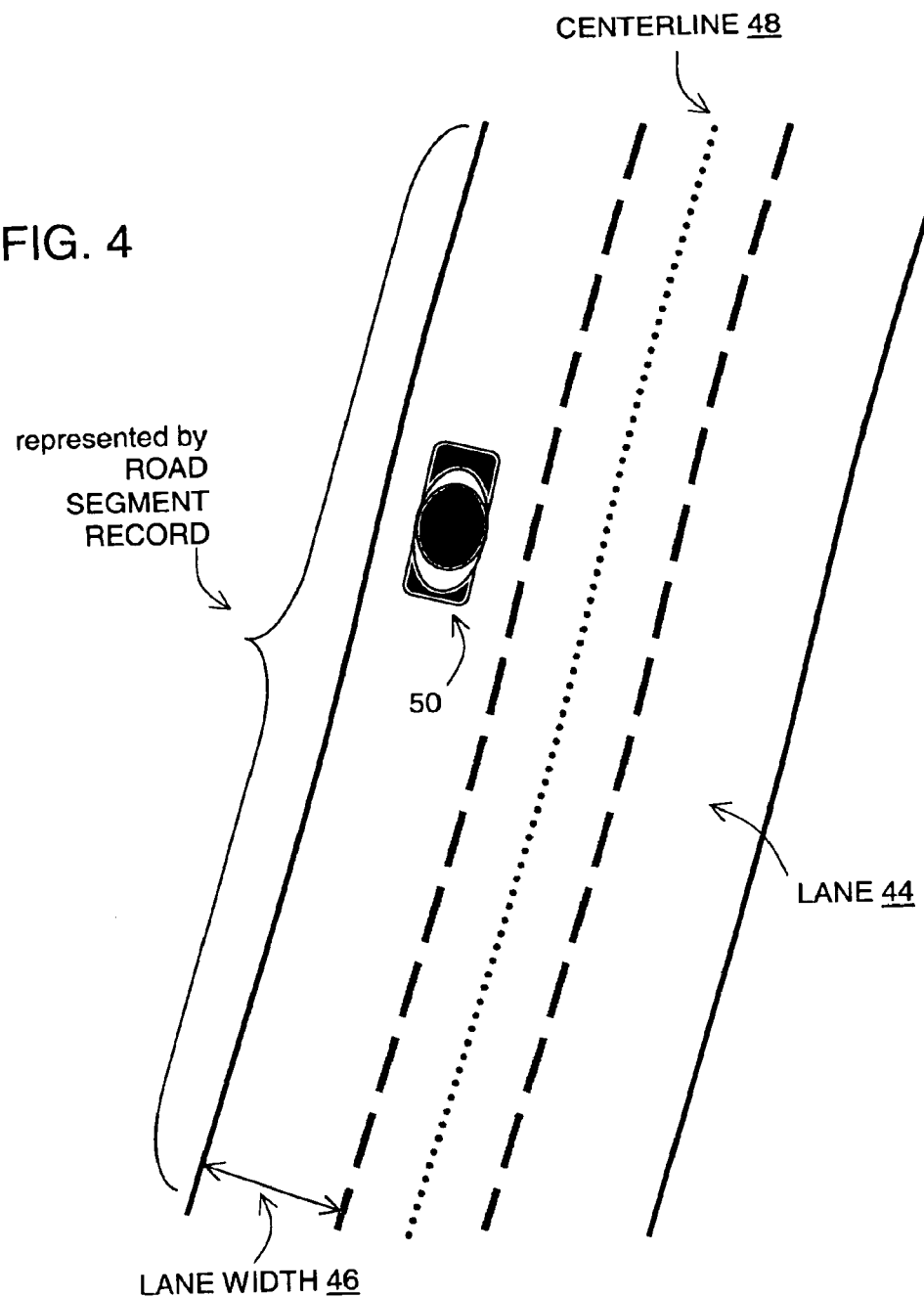
FIG. 4 shows a multi-lane road segment.

FIG. 3 shows some of the components of a road segment data record 34 contained in the geographic database 30. The road segment record 34 includes a segment ID 34(1) by which the data record can be identified in the geographic database 30. Each road segment data record 34 has associated with it information (such as "attributes", "fields", etc.) that describes features of the represented road segment. The road segment data record 34 may include data 34(2) that indicate the restrictions, if any, on the direction of vehicular travel permitted on the represented road segment. The road segment data record 34 includes data 34(3) that indicate a speed limit or speed category (i.e., the maximum permitted vehicular speed of travel) on the represented road segment. The road segment data record 34 may also include data 34(4) indicating whether the represented road segment is part of a controlled access road (such as an expressway), a ramp to a controlled access road, a bridge, a tunnel, a toll road, a ferry, and so on. The road segment record 34 may also include lane attribute data 34(5) that indicate the attributes of the lanes of the road segment. In one embodiment, the lane attribute data 34(5) includes a number of lanes data 34(5)(1), lane width data 34(5)(2) and centerline data 34(5)(3). FIG. 4 illustrates a portion of a one-way road segment having three lanes 44. FIG. 4 also illustrates a lane width 46 and a centerline 48. In one embodiment, the lane level data 34(5) provides an integer value for the number of lanes data 34(5)(1). In one embodiment, the lane width data 34(5)(2) comprises a single value in meters representing the lane width because each of the lanes 44 typically have approximately the same width. Alternatively, the lane width for each lane may be included in the lane width data 34(5)(2). In one embodiment, the centerline data 34(5)(3) includes a series of position points, such as geographic coordinates, representing the centerline.

Additionally, the centerline may be mathematically represented as known to those skilled in the art. Each lane may have data representing its respective centerline.

The road segment data record 34 also includes data 34(6) providing the geographic coordinates (e.g., the latitude and longitude) of the endpoints of the represented road segment. In one embodiment, the data 34(6) are references to the node data records 36 that represent the nodes corresponding to the endpoints of the represented road segment. The road segment data record 34 may also include or be associated with other data 34(7) that refer to various other attributes of the represented road segment. The various attributes associated with a road segment may be included in a single road segment record, or may be included in more than one type of record that are cross-referenced to each other. For example, the road segment data record 34 may include data identifying what turn restrictions exist at each of the nodes which correspond to intersections at the ends of the road portion represented by the road segment, the name or names by which the represented road segment is known, the street address ranges along the represented road segment, and so on.

Each of the node data records 36 may have associated information (such as "attributes", "fields", etc.) that allows identification of the road segment(s) that connect to it and/or its geographic position (e.g., its latitude and longitude coordinates). For the embodiment shown in FIG. 3, the node data records 36(1) and 36(2) include the latitude and longitude coordinates 36(1)(1) and 36(2)(1) for their node. The node data records 36(1) and 36(2) also include other data 36(1)(2) and 36(2)(2) for their node.

The data records 34 in the geographic database 30 that represent roads may not necessarily include all the same types of data attributes. One reason for this is that roads do not all have the same properties. For example, some roads have a highway designation (e.g., "Wisconsin State Highway 120") whereas other roads do not. Another reason why data records in the geographic database 30 that represent roads may not have the same data attributes is that some of the properties of a road may not have been collected or confirmed.

II. System for Obtaining Lane Level Data

A. Data Collection Vehicle

Figure 5:
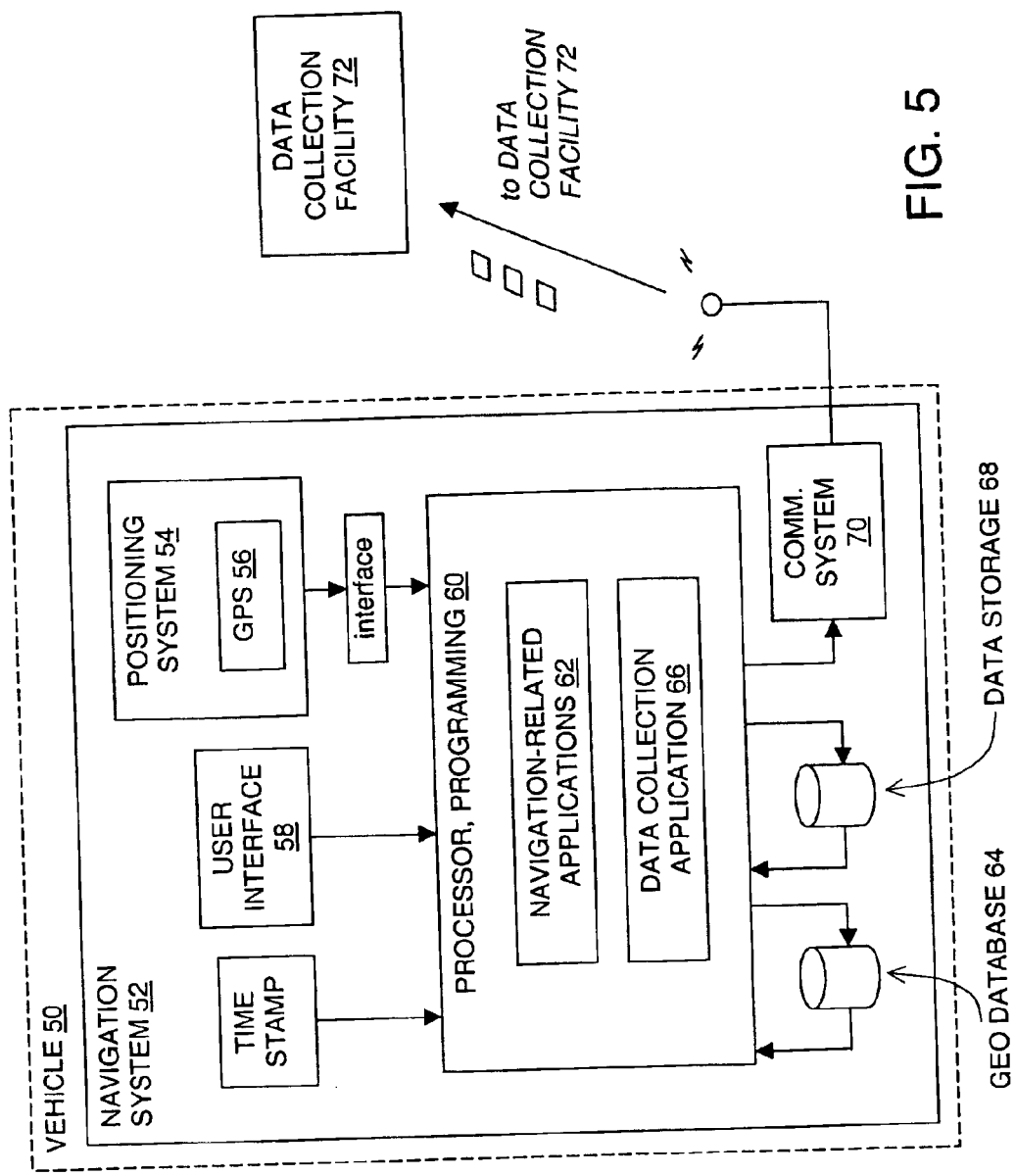
FIG. 5 is a block diagram illustrating a first embodiment in which a vehicle is equipped with a navigation system for data collection.

FIG. 5 shows a vehicle 50 equipped with a navigation system 52. The vehicle 50 is a probe vehicle. A probe vehicle is a vehicle that collects road-related data while it is being used for purposes unrelated to the collection of road-related data. For example, a probe vehicle is operated for ordinary, everyday purposes, such as commuting, leisure or business. A member of the public may operate the probe vehicle or alternatively a commercial enterprise or government entity may operate the probe vehicle. While the probe vehicle is being used for a purpose unrelated to the collection of road-related data, the navigation system 52 in the vehicle 50 operates to collect road-related data. Alternatively, the vehicle 50 is a data collection vehicle operated by a geographic database developer. The data collection vehicle is operated specifically for data collection purposes. The geographic database developer determines the routes traveled by the vehicle in order to collect specific data.

Referring to FIG. 5, the navigation system 52 is a combination of hardware and software components. The navigation system 52 includes a positioning system 54 that determines the position of the vehicle 50. The positioning system 54 includes a GPS unit 56. The positioning system 54 enables the position (e.g., latitude, longitude, and optionally altitude) of the navigation system 52 (and thus the vehicle 50 in which it is located) to be determined. The GPS unit 56 is a conventional GPS unit having an accuracy of approximately 15 meters. In addition to providing the position, the positioning system provides a direction of travel and speed of the vehicle 50.

The navigation system 52 also includes a user interface 58. The user interface 58 includes appropriate means for receiving instructions and/or input from an end user of the navigation system 52. The instruction receiving means may include a keyboard, keypad or other type of input panel, a microphone, as well as other means for accepting end user input, such as voice recognition software, and so on, through which the end user may request navigation information and services. The user interface 58 also includes appropriate means for providing information back to the end user. The information providing means may include a display and speakers (including speech synthesis hardware and software) through which the end user can be provided with information and services from the navigation system 52.

The navigation system 52 also includes the necessary hardware and software (processor and programming 60) to provide navigation-related features and to collect road-related data. The processor and programming 60 includes a navigation-related application 62 that uses a geographic database 64 to provide navigation-related features, such as route calculation and route guidance. The geographic database 64 includes data about the roads, intersections, etc., in the region in which the vehicle 50 is located. For the navigation-related application 60, the processor and programming 60 receive data from the positioning system 54 and the geographic database 64. The processor and programming 60 use these data to provide navigation-related functions, such as route calculation and route guidance, to the vehicle user via the user interface 58. Methods for making a navigation system 52 that provides these features are known to those of skill in the art.

The processor and programming 60 also includes a data collection application 66 that collects data while the vehicle 50 travels on roads in the geographic region. For the data collection application 66, the processor and programming 60 receives data from the positioning system 54. The programming and processor 60 includes the appropriate interfaces to allow data to be received from the positioning system 54. The processor and programming 60 are suitable for selecting the position data from the positioning system 54 at appropriate time periods, such as every second. Additionally, the processor and programming 60 may associate the data received from the positioning system 54 with a time stamp or any other information, such as other vehicle data.

The navigation system 52 includes a data storage device 68. The processor and programming 60 in the navigation system 52 provide for storing some or all the data from the positioning system 62. In one embodiment, the data from the positioning system 62 stored on the data storage device include latitude and longitude data, time stamp, vehicle direction and speed. The data storage device 68 is a non-volatile data storage unit, such as a hard drive or a memory card.

The navigation system 52 also includes a communications system 70. The communications system 70 provides for sending some or all the data from the positioning system 54 to a remotely located data collection facility 72. In the embodiment of FIG. 5, the communications system 70 provides for wireless transmission of the data from the navigation system 52 to the remotely located data collection facility 72. In the embodiment of FIG. 5, the data sent from the navigation system 52 are stored temporarily on the data storage device 68 before being transmitted to the data collection facility 72. Various processes may be performed on the data before they are sent to the remotely located data collection facility 72. For example, the data may be compressed, filtered, normalized, etc. These processes may be performed to reduce the amount of data that need to be sent from the navigation system 52 to the data collection facility 72.

In one alternative, the data collected by the navigation system 52 are sent every several seconds or minutes to the data collection facility 72 after being temporarily stored on the data storage device 68 in the navigation system 52. In another alternative embodiment, the data collected by the navigation system 52 are sent directly to the data collection facility 72 without being temporarily stored on a data storage device in the navigation system 52.

In another alternative embodiment, the data collected by the navigation system 52 are stored in the vehicle for a relatively long period of time, e.g., several days or weeks. The data are then sent to the data collection facility 72. The data may be sent wirelessly via a communications system or alternatively, the data may be sent by other means. For example, the data may be transmitted over land-based telephone lines or the Internet. In another embodiment, the data storage medium upon which the data are stored is physically sent to the data collection facility 72 (e.g., by mail). At the data collection facility 72, further processing of the data takes place.

B. Data Collection Facility

Figure 6:
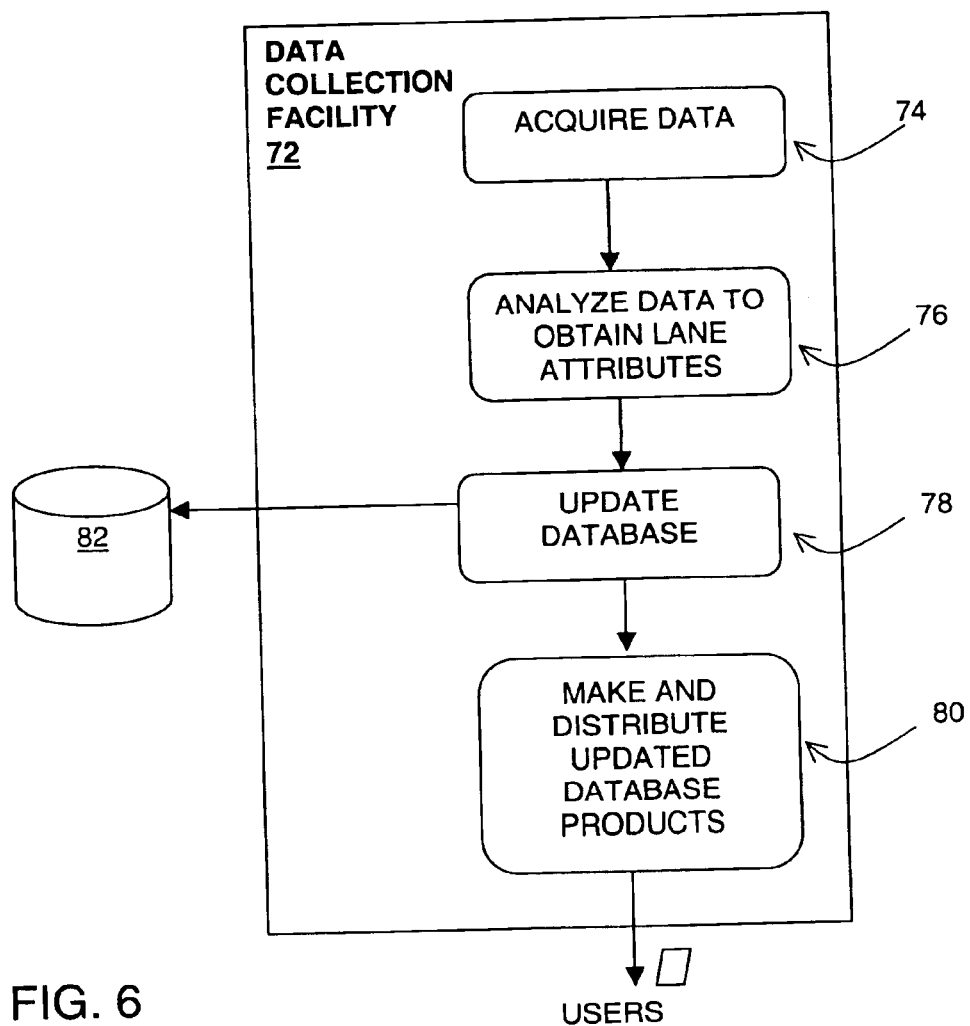
FIG. 6 is a flow chart of the operations of a data collection facility.

According to one embodiment, the data collection facility 72 obtains lane attribute data and updates the geographic database following the steps shown in FIG. 6. The data collection facility 72 receives the data from the vehicles 50 at step 74. The data collection facility 72 obtains the data from numerous probe vehicles. Alternatively, the data collection facility 74 may obtain the data from data collection vehicles that are operated by the geographic database developer. The data collection facility 72 may obtain the data from the vehicles 50 by wireless data transmission or by other means (e.g., sending a diskette or via modem).

The data collection facility 72 processes the data received from the vehicles 50 to obtain lane attribute data at step 76. The data collection facility 72 includes processor and programming for processing the data. In one embodiment, the data collection facility 72 processes the data from the vehicles 50 to identify the number of lanes for a road segment traveled by the vehicles 50. In another embodiment, the data collection facility 72 processes the data from the vehicles 50 to identify an approximate lane width of the lanes for a road segment traveled by the vehicles 50. In another embodiment, the data collection facility 72 processes the data from the vehicles 50 to infer a centerline of the lanes for a road segment traveled by the vehicles 50. In a further embodiment, the data collection facility 72 processes the data from the vehicles 50 to identify a number of lanes, lane width(s), lane centerline(s), lane boundaries and road edge data for a road segment traveled by the vehicles 50.

Figure 7:
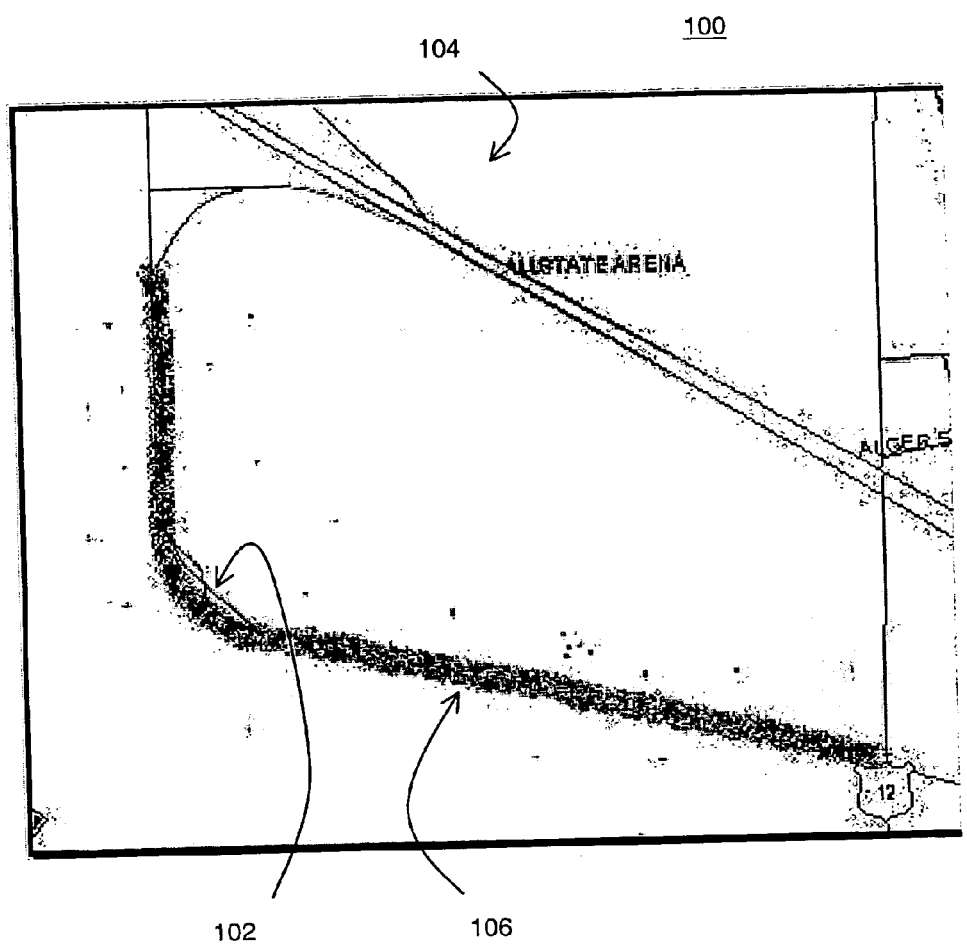
FIG. 7 shows a map of a portion of a geographic region.

FIG. 7 illustrates a portion of the geographic region 100 including a road segment 102 provided by a digital map 104. FIG. 7 also shows the position tracks 106 from multiple probe vehicles 50 traveling on the road segment 102 overlaid on the digital map 104. The position tracks 106 are the numerous position data points (latitude and longitude points) from the vehicles 50 as they travel the road segment 102. As observable in FIG. 7, the position tracks 106 provide a data belt that gives a good estimate of where the actual road segment is located. With data from numerous probe vehicles 50, lane attribute data may be obtained by evaluating a cross sectional distribution of the position data (latitude and longitude data). The cross sectional distribution of the position data is a plot of the relative horizontal location of position data points versus the number of data points at those locations. Methods for obtaining the cross sectional distribution will be described below in conjunction with FIG. 13.

Figure 8:
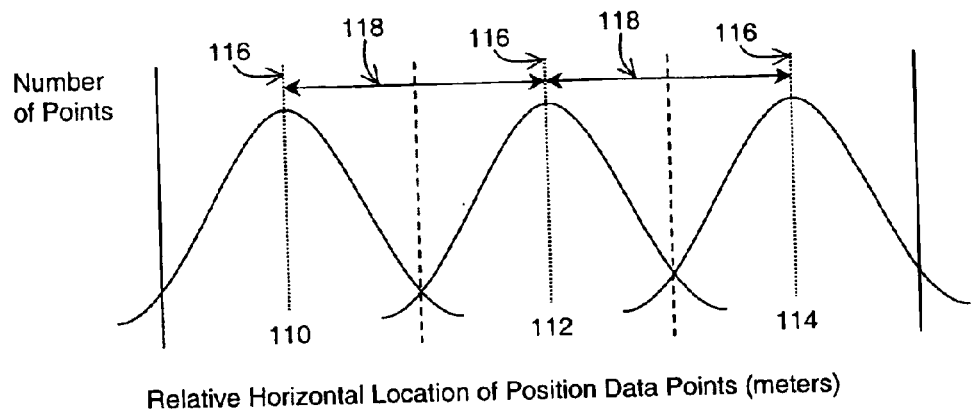
FIG. 8 is a cross sectional distribution of position data points for a three lane road segment collected with highly accurate positioning equipment.

FIG. 8 illustrates a theoretical graph of a cross sectional distribution of position data points for a road segment traveled by the vehicles 50 having highly accurate positioning systems. Highly accurate positioning systems include differential GPS ("DGPS") units that have an accuracy of approximately one meter. Thus, the accuracy of the DGPS positioning system is less than the width of typical lanes of a road segment. For example, the accuracy of the DGPS positioning system is approximately one meter and the width of the typical road lane is around 3 meters. As shown in cross sectional distribution of the highly accurate position data of FIG. 8, the lane attribute information is readily observable. From evaluating FIG. 8, the road segment has three concentrations of position data points representing three lanes, a left lane 110, a center lane 112 and a right lane 114. The centerline 116 for each lane is located at approximately a peak of each of the respective curves. The lane width 118 is approximately a distance between two adjacent centerlines 116.

Although lane attribute information may be available by evaluating the position data from vehicles with highly accurate positioning systems, the highly accurate positioning systems have some drawbacks. For example, the highly accurate positioning systems are relatively expensive. Additionally, many conventional navigation systems do not have the highly accurate positioning systems; rather, most conventional navigation systems have positioning systems with GPS units that an accuracy of approximately 15 meters.

The position data from vehicles 50 having positioning systems with the accuracy of approximately 15 meters may also be analyzed to determine lane attribute information. The follow description illustrates a system and method for determining lane attribute information using data collected with 15 meter accuracy positioning systems.

Figure 9:
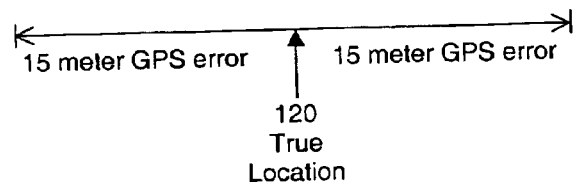
FIG. 9 illustrates the accuracy of the GPS positioning equipment.
Figure 10A:
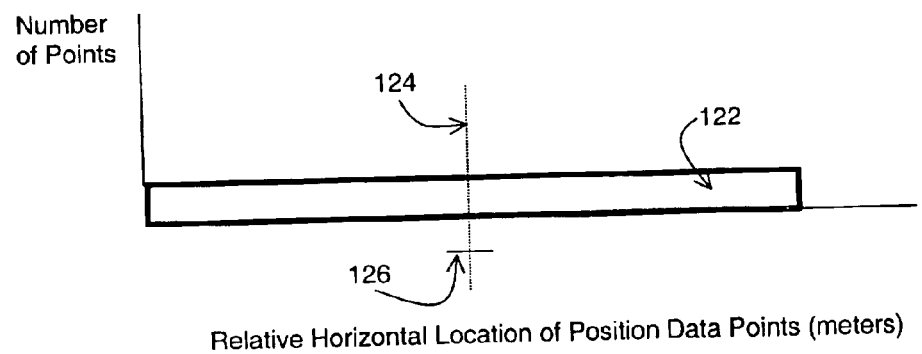
FIGS. 10a and 10b are cross sectional distributions of position data points for a single lane road collected with GPS positioning equipment.

FIG. 9 illustrates a range of possible positions in two dimensions for the vehicle 50 having the positioning system 54 with 15 meters accuracy. The actual position data may be approximately 15 meters in any direction from the true location 120 of the vehicle 50. FIG. 10*a* illustrates a graph of a cross sectional distribution of position data points for a single lane road segment traveled by the vehicles 50 having 15 meter accurate positioning systems. Because the 15 meter accurate GPS unit is random in locating the position, the cross section distribution may be modeled as a rectangular band 122. That is, with enough data points, the location of the position data may be modeled as spreading out approximately 15 meters to either side of the actual centerline 124 of the lane 126 providing the rectangular band 122 of data about 30 meters in width. The height of the band 122 depends on the number of vehicles 50 traveling the road segment.

Figure 10B:
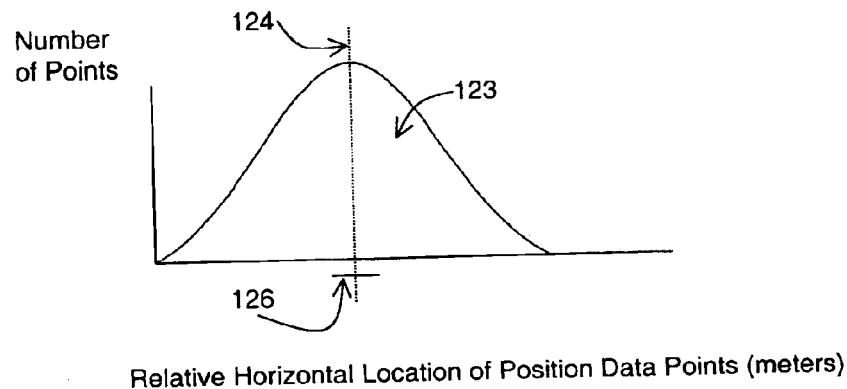

FIG. 10*b* also illustrates a graph of a cross sectional distribution of position data points for a single lane road segment traveled by the vehicles 50 having 15 meter accurate positioning systems. Experiments have found that the cross sectional distribution of position data will unlikely have the perfectly rectangular shape as modeled in FIG. 10*a*. More likely, the cross sectional distribution of position data is closer to a normal or bell-shaped curve band 123 as shown in FIG. 10*b*. The tails of the normal curve extend approximately 15 meters to either side of the actual centerline 124 of the lane 126 providing the normal curve shaped band 123 of data approximately 30 meters in width. The height of the band 123 depends on the number of vehicles 50 traveling the road segment. The majority of position points may occur approximately 2.5 meters on either side of the centerline 124 of the lane 126.

Figure 11A:
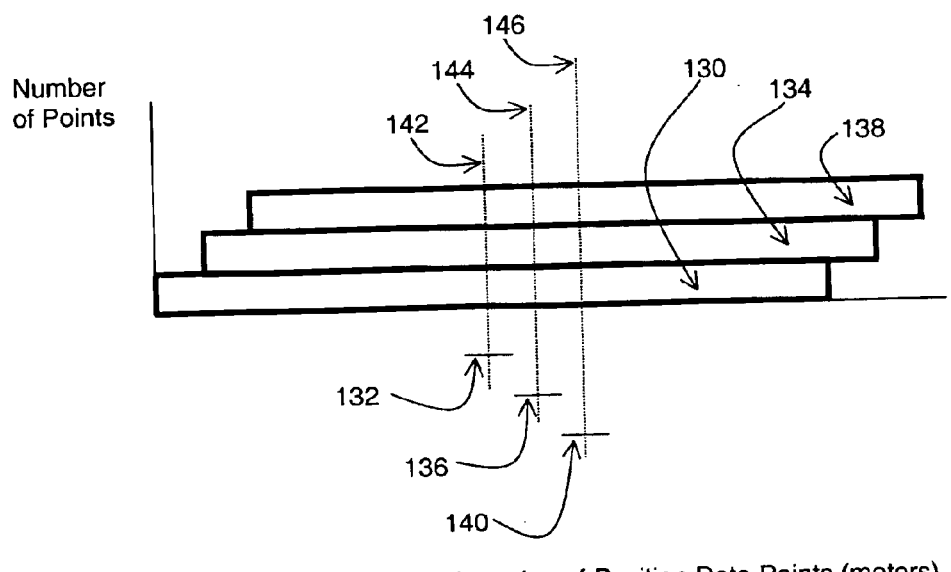
FIGS. 11a, 11b and 11c are cross sectional distributions of position data for a three lane road segment collected with GPS positioning equipment.
Figure 11B:
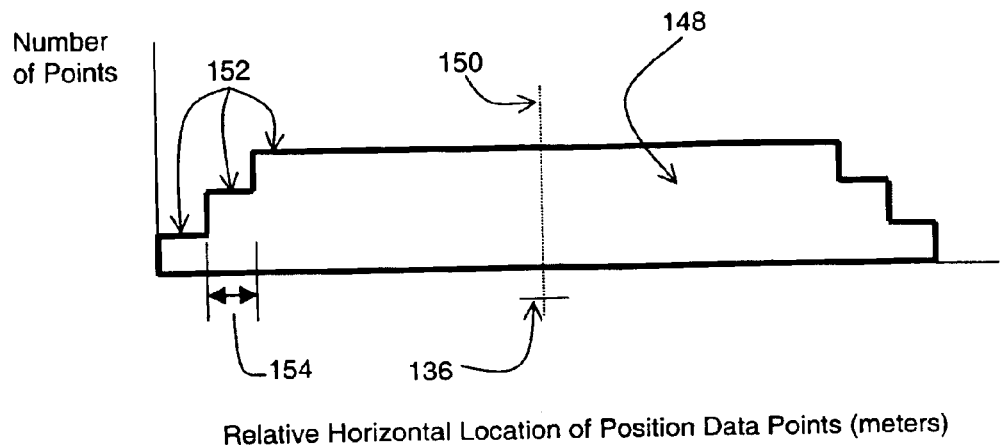
Figure 11C:
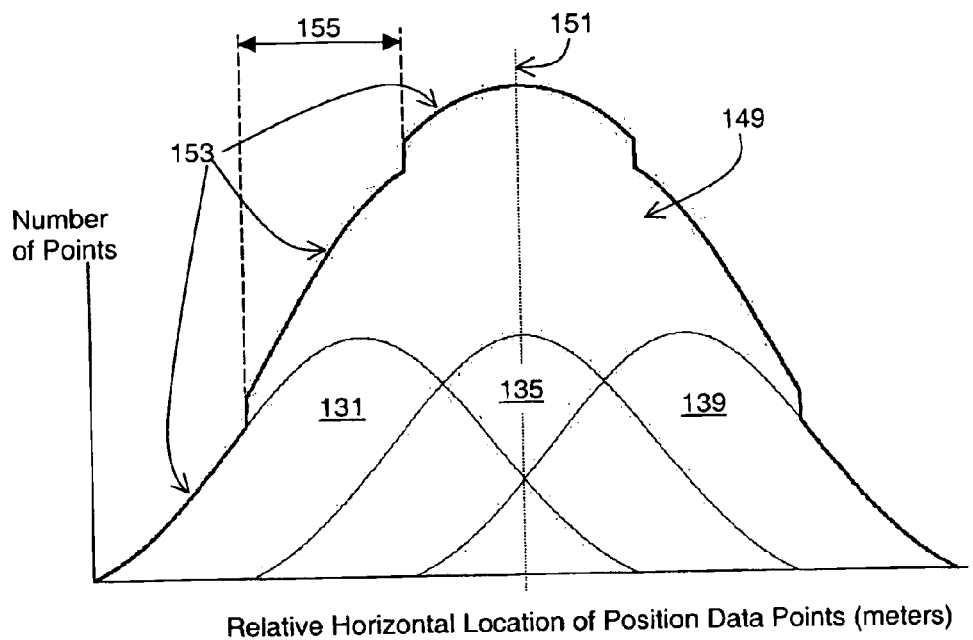

FIGS. 11*a*, 11*b* and 11*c* illustrate graphs of a cross sectional distribution of position data points for a one-way, three lane road segment with three lanes traveled by the vehicles 50 having 15 meter accurate positioning systems. For each lane, the cross sectional distribution of the position data collected from the vehicles traveling the lane may be modeled as the rectangular band 122 illustrated in FIG. 10*a*. FIG. 11*a* illustrates a band 130 for a left lane 132, a band 134 for a center lane 136, and a band 138 for a right lane 140. The bands 130, 134 and 138 are modeled as rectangular for the purpose of illustration; however, the cross sectional distribution of data for each band tends to correspond more similarly with the normal curve shaped band 123 illustrated in FIG. 10*b*. Also assuming approximately equal numbers of vehicles have traveled in each lane, the bands 130, 134 and 138 have approximately the same heights; however, the band heights may vary depending on the number of vehicles that have traveled each lane. Referring to FIG. 11*a*, each of the lanes 132, 136, 140 has a centerline 142, 144 and 146 respectively located at the midpoint of its respective band 130, 134 or 138.

FIG. 11*b* illustrates the individual lane distributions of position data (bands 130, 134 and 138) of FIG. 11*a* combined into a single distribution 148. At approximately the midpoint of the distribution 148 is a location of a centerline 150 of the center lane 136. The distribution 148, regardless of whether the shape of the composite distributions is rectangular, will have delineated steps or shoulders 152 indicating the number of lanes. For the distribution 148 of FIG. 11*b*, three steps 152 indicate that the road segment has three lanes. Approximate lane width 154 is the horizontal distance between the edges of adjacent steps 152. Additionally, the location of the centerline and boundaries of each of the lanes are readily determined using the location of the centerline 150 and the value of the lane width 154. For example, the location of the centerline of the left lane 132 is located left along the line used to form the distribution at a distance approximately one lane width value from the centerline 150, and the location of the left boundary of the left lane 132 is located left along the line use to form the distribution at a distance approximately one and one half lane widths from the centerline 150.

FIG. 11*c* illustrates theoretical graphs of cross sectional distributions of position data points for a one-way, three lane road segment with three lanes traveled by the vehicles 50 having 15 meter accurate positioning systems. For each lane, the cross sectional distribution of the position data collected from the vehicles traveling the lane form the normal curve shaped band 123 illustrated in FIG. 10*b*. FIG. 11*c* illustrates a normal curve shaped band 131 for the left lane, a normal curve shaped band 135 for the center lane, and a normal curve shaped band 139 for the right lane. Also assuming approximately equal numbers of vehicles have traveled in each lane, the bands 131, 135 and 139 have approximately the same heights; however, the band heights may vary depending on the number of vehicles that have traveled each lane. FIG. 11*c* also illustrates the individual lane distributions of position data (bands 131, 135 and 139) combined into a single distribution 149. At approximately the midpoint of the distribution 149 is a location of a centerline 151 of the center lane. The distribution 149, similar to the distribution 148, has delineated steps or shoulders 153 indicating the number of lanes. For the distribution 149 of FIG. 11c, three steps 153 indicate that the road segment has three lanes. Approximate lane width 155 is the horizontal distance between the edges of adjacent steps 153. Additionally, the location of the centerline and boundaries of each of the lanes are readily determined using the location of the centerline 151 and the value of the lane width 155.

Figure 12A:
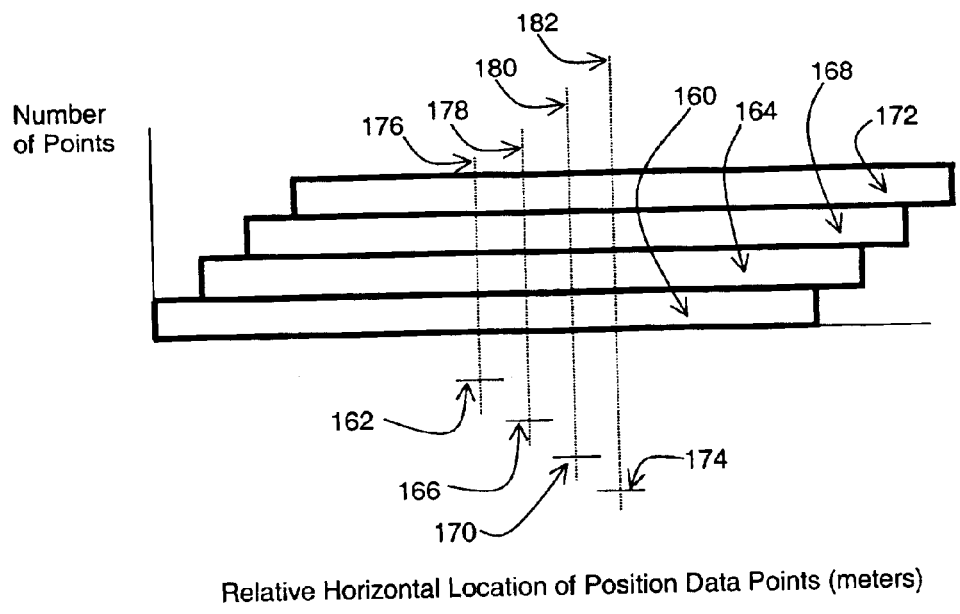
FIGS. 12a and 12b are cross sectional distributions of position data for a four lane road segment collected with GPS positioning equipment.
Figure 12B:
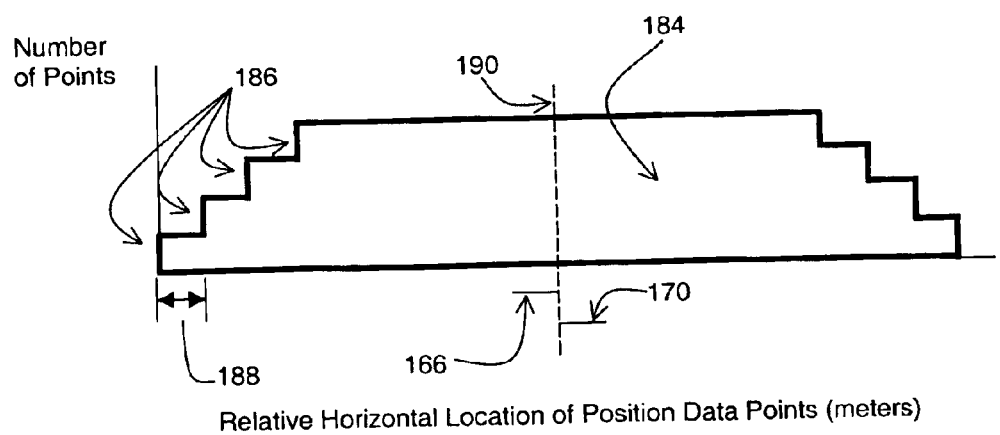

FIGS. 12a and 12b illustrate graphs of a cross sectional distribution of position data points for a one-way, four lane road segment traveled by the vehicles having 15 meter accurate positioning systems. For each lane, the cross sectional distribution of the position data collected from the vehicles traveling the lane are modeled for the purpose of illustration as the rectangular band 122 illustrated in FIG. 10a. Alternatively, the cross sectional distribution of the position data may be illustrated with the normal curve shaped band 123 illustrated in FIG. 10b. FIG. 12a illustrates a band 160 for a left lane 162, a band 164 for a left-center lane 166, a band 168 for a right-center lane 170, and a band 172 for a right lane 174. Also assuming approximately equal numbers of vehicles have traveled in each lane, the bands 160, 164, 168 and 172 have approximately the same heights; however, the band heights may vary depending on the number of vehicles that have traveled each lane. Referring to FIG. 12a, each of the lanes 162, 166, 170, 174 has a centerline 176, 178, 180, 182 respectively located at the midpoint of its respective band 160, 164, 168 or 172.

FIG. 12b illustrates the individual lane distributions of position data (bands 160, 164, 168 and 172) of FIG. 12a combined into a single distribution 184. The distribution 184, regardless of whether the shape of the composite distributions is rectangular, normal curve shaped or any other shape, will have delineated steps 186 indicating the number of lanes. For the distribution 184 of FIG. 12b, four steps 186 indicate that the road segment has four lanes. Approximate lane width 188 is the horizontal distance between the edges adjacent steps 186. At approximately the midpoint of the distribution 184 is a location of a lane boundary line 190 that separates the left-center lane 166 from the right-center lane 170. Additionally, the locations of centerline and boundaries of each of the lanes are readily determined using the location of the boundary line 190 and the value of the lane width 188. For example, the location of the centerline of the left-center lane 166 is located left along the line used to form the distribution at a distance approximately one half of the lane width value from the boundary line 190, and the location of the left boundary of the left lane 162 is located left along the line use to form the distribution at a distance approximately two lane widths from the boundary line 190.

Figure 13:
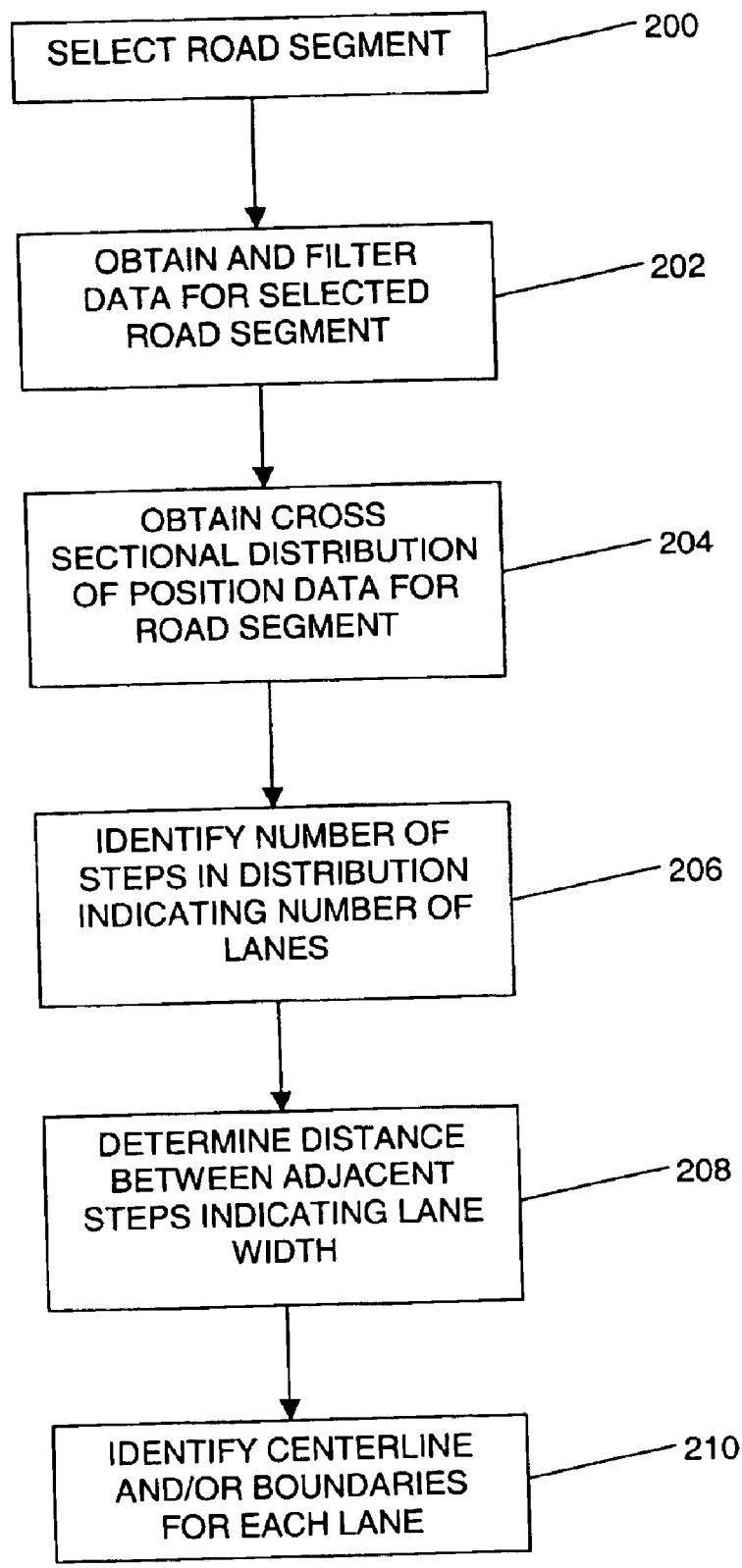
FIG. 13 is a flow chart of the analysis operations of the data collection facility to obtain lane attribute information.

FIG. 13 illustrates a flow chart of the analysis operations performed by the data collection facility 72 to obtain the lane attribute data (see FIG. 6, step 76). After obtaining the data from the vehicles 50, the data collection facility 72 selects a road segment at step 200. The road segment may be selected based upon numerous possible criteria including a road segment that has a significant amount of collected position data, a road segment for which lane attribute data is desired, and any other criteria.

At step 202, the data collection facility 72 obtains and filters the data corresponding to the road segment. The data may be filtered according to one or more filtering criteria to insure that the position data can be assumed to be associated with the vehicle traveling one of the lanes of the selected road segment with minimal deviation outline of the lanes of the selected road segment. For these goals, the filtering criteria may include a minimum speed and predetermined direction. The data collection facility 72 saves the position data meeting the filtering criteria for further analysis and discards the position data not meeting the filtering criteria.

At step 204, the data collection facility 72 obtains a cross sectional distribution of position data for the selected road segment. The cross sectional distribution of the position data illustrates the number of position data points at relative horizontal locations across the road segment. The cross sectional distribution of the position data may be obtained with several methods. One embodiment uses an existing digital map and places a line approximately perpendicular to the represented road segment of the digital map at a location on the road segment, preferably away from nodes that may be associated with an intersection. All position data points (latitude and longitude data) that fall on the line form the cross sectional distribution of the position data. Additionally, the position data that do not fall on the line may be interpolated to contribute to the distribution. Another embodiment uses the position data traces and places a line approximately perpendicular to the position data traces. The position data traces may be represented with a data belt, such as visible in FIG. 7, and the line may be placed approximately perpendicular to the data belt. Additionally, another embodiment determines a best-fit line for sections of the position data and places the line approximately perpendicular to the best-fit line. The best-fit line may be obtained using any appropriate method. All position data points that fall on the line form the cross sectional distribution of the position data. Additionally, the position data that do not fall on the line may be interpolated to contribute to the distribution. Alternatively, the cross sectional distribution may be determined using any appropriate method. Additionally, the central data facility 72 may filter the outlier data points from the distribution.

After the cross sectional distribution of the position data is obtained, the data collection facility 72 identifies a number of steps in the distribution indicating a number of lanes of the road segment at step 206. This identifying step may be done automatically with a software program or manually by a technician. For example, the distribution of FIGS. 11b and 11c has three steps 152 indicating three lanes, and the distribution of FIG. 12 has four steps 186 indicating four lanes. Although the steps may not be indicated by right angles, with numerous data points contributing to the distribution, the demarcations of the steps should be readily identifiable.

Once the steps in the distribution are identified, the central data facility 72 determines the horizontal distance between edges of adjacent steps indicating a lane width at step 208. Referring to FIG. 11b for example, the horizontal distance between the left-most step edge and its adjacent step edge 152 on the left side of the distribution 148 indicates the lane width of the left lane. The horizontal distance between the right-most step edge and its adjacent step edge on the right side of the distribution 148 indicates the lane width of the right lane. The horizontal distance between the middle step edge and its adjacent right step edge on the left side of the distribution 148 indicates the lane width of the middle lane; the horizontal distance between the middle step edge and its adjacent left step edge on the right side of the distribution 148 also indicates the lane width of the middle lane.

Referring to FIG. 12b, the horizontal distance between the left-most step edge and its adjacent step edge 186 on the left side of the distribution 184 indicates the lane width of the left lane. The horizontal distance between the right-most step edge and its adjacent step edge on the right side of the distribution 184 indicates the lane width of the right lane. The horizontal distance between the middle-left step edge and its adjacent right step edge on the left side of the distribution 148 indicates the lane width of the left-center lane; the distance between the middle-left step edge and its adjacent left step edge on the right side of the distribution 184 also indicates the lane width of the left-center lane. The distance between the middle-right step edge and its adjacent right step edge on the left side of the distribution 184 indicates the lane width of the right-center lane; the distance between the middle-right step edge and its adjacent right step edge on the right side of the distribution 184 also indicates the lane width of the right-center lane.

At step 210, the central data facility 72 identifies the location(s) of the centerline and/or boundaries for the lane(s) of the road segment. For distributions having an odd number of steps, such as shown in FIG. 3, the location of a centerline of the middle lane is the center of the distribution 148. The location of the centerlines of the other lanes may readily be determined using the lane widths. For example, the location of the centerline of the left lane 132 is located left along the line used to form the distribution at a distance approximately equal to the sum of one half of the width of the middle lane and one half of the width of the left lane. The location of the right boundary of the left lane 132 is located left along the line used to form the distribution at a distance approximately equal to one half of the width of the middle lane. The location of the centerline and boundaries of the other lanes may be determined in a similar manner. For distributions having an even number of steps, such as shown in FIG. 4, the center of the distribution 184 is the location of the boundary line between the center two lanes. The location of the centerline and boundaries of the various lanes may be determined as distances of lane widths from the center boundary line.

Referring to FIG. 6, after the analysis of step 76, the lane attribute data are stored in a master copy 82 of the geographic database at step 78. The lane attribute data may be stored as an attribute to the road segment data record 34. The lane attribute data that are stored in the master copy 82 of the geographic database may be used to update existing data or to add new data. For example, the master copy 82 of the database may already include lane attribute data for a particular represented road segment. The new lane attribute data obtained using the process described in FIG. 6 can be used to update the existing data, e.g., confirm the existing data or make the existing data more accurate. Alternatively, the master copy 82 of the geographic database may not include lane attribute data for a particular road segment. If new lane attribute data are obtained for a road segment that is represented by a data record that does not already include a lane attribute data, the new lane attribute data can be added as a new attribute of the data record.

In one embodiment, prior to updating existing data or adding new data to the master copy of the geographic database with the lane attribute data, the existence and accuracy of some the identified lane attribute information may be confirmed by direct observation of field personnel.

The geographic database with new or improved lane attribute data and other data can be used to make derived database products at step 80. The derived database products may include only portions of all the data in the master version 82 of the database. For example, the derived database products may include data that relate to only one or more specific regions. The derived database products may be used on various kinds of computing platforms. For example, the derived database products may be used in navigation systems (such as in-vehicle navigation systems and hand-held portable navigation systems), personal computers (including desktop and notebook computers), and other kinds of devices (such as Palm Pilot®-type devices, pagers, telephones, personal digital assistants, and so on). Derived database products may also be used on networked computing platforms and environments, including the Internet. The derived database products may be in a different format than the format in which the master copy of the database is maintained. The derived database products may be in a format that facilitates the uses of the derived products in the platforms in which they are installed. The derived database products may also be stored in a compressed format on the media on which they are located.

III. Alternatives

In another embodiment, the vehicle 50 used to collect position data has a data collection unit in place of the navigation system 52 in FIG. 5. The data collection unit includes many of the elements and features of the navigation system 52. For example, the data collection unit includes a positioning system with a GPS unit. The data collection unit includes processor and programming and provides the functions of the data collection application 66 in FIG. 5 but does not provide the navigation-related applications 62.

In an alternative embodiment, the data collection facility 72 determines a number of lanes of the road segment by evaluating a distance between the end edges of the cross sectional distribution. Rather than identifying the number of steps in the distribution, the alternative embodiment determines the horizontal distance between the two end edges of the distribution and compares the distance to expected values. Referring to FIG. 11*b*, the end edges of the distribution are the left most step edge and the right most step edge. The expected values for distance between the two ends of the distribution for a one lane road is approximately 30 meters, for a two lane road is approximately 33 meters, for a three lane road is approximately 36 meters, for a four lane road approximately 39 meters and so on. The approximate values are derived from the 15 meter accuracy of the GPS unit providing the distribution that is approximately 30 meters between the two end edges. Since the typical lane width is approximately 3 meters, each additional lane adds approximately 3 meters to the 30 meter distribution.

Figure 14:
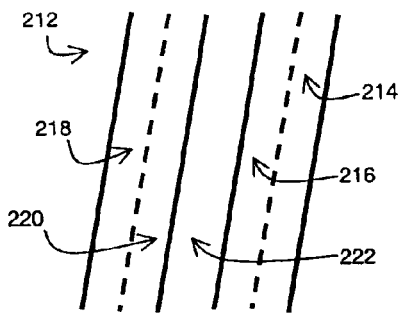
FIG. 14 shows a multi-lane road segment.
Figure 15A:
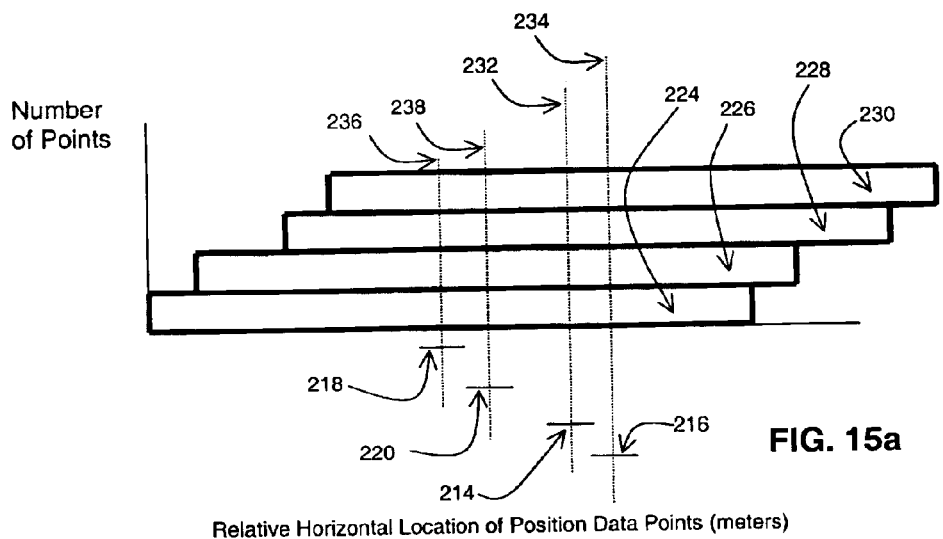
FIGS. 15a and 15b are cross sectional distributions of position data for the road segment of FIG. 14 collected with GPS positioning equipment.
Figure 15B:
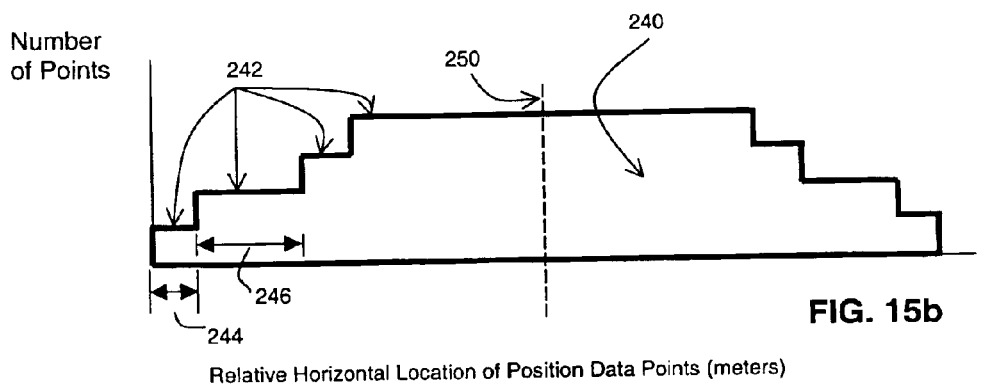

In a further embodiment, the data collection facility 72 identifies any medians or boundaries separating adjacent lanes of a road segment. FIG. 14 illustrates a road segment 212 having two right lanes 214, 216 and two left lanes 218, 220 separated by a median 222. FIGS. 15*a* and 15*b* illustrate graphs of a cross sectional distribution of position data points for the road segment 212 illustrated in FIG. 14 traveled by the vehicles having 15 meter accurate positioning systems. For each lane, the cross sectional distribution of the position data collected from the vehicles traveling the lane is modeled as the rectangular band 122 illustrated in FIG. 10*a*. Alternatively, the cross sectional distribution of the position data may be illustrated with the normal curve shaped band 123 illustrated in FIG. 10*b*. FIG. 15*a* illustrates bands 224, 226 for the two left lanes 218, 220 and bands 228, 230 for the two right lanes 214, 216. Also assuming approximately equal numbers of vehicles have traveled in each lane, the bands 224, 226, 228 and 230 have approximately the same heights; however, the band heights may vary depending on the number of vehicles that have traveled each lane. Referring to FIG. 15*a*, each of the lanes 214, 216, 218 and 220 has a centerline 232, 234, 236 and 238 respectively located at the midpoint of its respective band 228, 230, 224 or 226.

FIG. 15b illustrates the individual lane distributions of position data (bands 224, 226, 228 and 230) of FIG. 15a combined into a single distribution 240. The distribution 240, regardless of whether the shape of the composite data is rectangular, normal curve shaped or any other shape, will have delineated steps 242 indicating the number of lanes. For the distribution 240 of FIG. 15b, four steps 242 indicate that the road segment has four lanes. Approximate lane width 244 is the horizontal distance between certain edges of adjacent steps 242, for example, the left most step edge and its adjacent step edge on the left side of the distribution 240. For the distribution 240, the edges of the center steps are considerably farther apart than the other edges. When a horizontal distance between one set of adjacent edges is larger than a horizontal distance between another set of adjacent edges by a predetermined amount indicates the presence of the median 222. The predetermined amount is a value larger than typical variations among lane widths, such as approximately one fourth of a meter. The width of the median is the horizontal distance between the edges of the center steps 246 less the lane width 244. At approximately the midpoint of the distribution 240 is a location of a centerline of the median 250.

It is intended that the foregoing detailed description be regarded as illustrative rather than limiting and that it is understood that the following claims including all equivalents are intended to define the scope of the invention.

I claim:

1. A method of obtaining data for a geographic database using a plurality of vehicles moving on roads in a geographic region comprising the steps of:
   for each vehicle, collecting data indicating positions of the vehicle as the vehicle travels the roads in the geographic region,
   for a location on a selected road, obtaining a cross sectional distribution graph of the position data;
   identifying a number of incremental steps in said distribution graph to indicate a number of lanes on the selected road; and
   updating said geographic database with said data indicating said number of lanes.

2. The method of claim 1 further comprising determining a lane width as a distance between adjacent incremental steps of said distribution graph.

3. The moth of claim 1 further comprising if said number of incremental steps is an odd number, identifying a location of a centerline as a position corresponding to a center of said distribution graph.

4. The method of claim 1 further comprising if said number of incremental steps is an even number, identifying a location of a lane boundary line as a position corresponding to a center of said distribution graph.

5. The method of claim 1 further comprising:
   determine a lane width as a distance between adjacent incremental steps of said distribution graph;
   if said number of incremental steps is an odd number, identifying a location of a lane boundary line as a position approximately a distance of one half of said lane width from a position corresponding to a center of said distribution graph; and
   if said number of incremental steps is an even number, identifying a location of a lane center line as a position approximately a distance of one half of said lane width from the position corresponding to the center of said distribution graph.

6. The method of claim 1 wherein the position data is collected with a vehicle navigation system.

7. The method of claim 1 further comprising filtering the position data.

8. The method of claim 1 wherein the position data is determined with a positioning system having accuracy worse than a width of a lane of said roads.

9. The method of claim 8 wherein said positioning system is a GPS unit having accuracy of approximately 15 meters.

10. The method of claim 1 further comprising inferring a location of a median on the selected road segment.

11. A method for collecting data for a geographic database that represents roads in a geographic region, the method comprising:
   with a plurality of vehicles that travel along the roads, collecting position data having accuracy worse than a width of a lane of the road;
   obtaining a cross sectional distribution graph of the position data for a selected road;
   analyzing said cross sectional distribution graph, wherein said analyzing step comprises identifying a number of incremental steps in said distribution graph indicating a number of lanes of the selected road; and
   storing data in said geographic database that represent lane attribute information.

12. A method for collecting data for a geographic database that represents roads in a geographic region, the method comprising:
   with a plurality of vehicle that travel along the roads, collecting position data having accuracy worse than a width of a lane of the road;
   obtaining a cross sectional distribution graph of the position data for a selected road;
   analyzing said cross sectional distribution graph, wherein said analyzing step comprising determining a distance between end edges of said distribution graph and comparing said distance to predetermined values indicating a number of lanes of said selected road; and
   storing data in said geographic database that represent lane attribute information.

13. A method for collecting data for a geographic database that represents roads in a geographic region, the method comprising:
   with a plurality of vehicles that travel along the roads, collecting position data having accuracy worse than a width of a lane of the road;
   obtaining a cross sectional distribution graph of the position data for a selected road;
   analyzing said cross sectional distribution graph, wherein said analyzing step comprises determining a lane width as a distance between adjacent incremental steps of said distribution graph; and
   storing data in said geographic database that represent lane attribute information.

14. The method of claim 11 wherein said analyzing step comprises:
   if said number of incremental steps is an odd number, identifying a location of a centerline corresponding to a center of said distribution graph; and
   if said number of incremental steps is an even number, identifying a location of a lane boundary line corresponding to a center of said distribution graph.

15. The method of claim 11 wherein said analyzing step comprises:

determining a lane width as a distance between adjacent incremental steps of said distribution graph;

if said number of incremental steps is an odd number, identifying a location of a lane boundary line as a position approximately a distance of one half of said lane width from a center of said distribution graph; and if said number of incremental steps is an even number, identifying a location of a lane centerline as a position approximately the distance of one half of said lane width from the center of said distribution graph.

16. A method for collecting data for a geographic database that represents roads in a geographic region, the method comprising:

with a plurality of vehicles that travel along the roads, collecting position data having accuracy worse than a width of a lane of the road;

obtaining a cross sectional distribution graph of the position data for a selected road;

analyzing said cross sectional distribution graph, wherein said analyzing step comprises:

for one side of the distribution graph, identifying distance values between each adjacent incremental step;

if one of said distance values is larger than another of said distance values by a predetermined amount, inferring a location of a median; and storing data in said geographic database that represent lane attribute information.

17. The method of claim 11 wherein said position data is determined with a GPS unit having accuracy of approximately 15 meters.

18. A system for collecting data for a geographic database that represents roads in a geographic region comprising:

a data collection unit located in a vehicle that travel along the road in the geographic region;

a GPS unit associated with the vehicle, said GPS unit providing position data having an accuracy worse than a width of a lane of the roads to said data collection unit;

a data processing unit receiving position data from a plurality of the vehicles, obtaining a cross sectional distribution graph of the position data and identifying a number of incremental steps in said distribution graph to indicate a number of lanes.

19. The system of claim 18 wherein said data processing unit is located in a data collection facility.

20. The system of claim 18 wherein said data processing unit determines a distance between end edges of said distribution graph and compares said distance to predetermined values indicating a number of lanes of a selected road.

21. The system of claim 18 wherein said data processing unit determines a lane width as a distance between adjacent incremental steps of said distribution.

22. The system of claim 18 wherein the data processing unit identifies said number of incremental steps in said distribution graph; if said number of incremental steps is an odd number, the data processing unit identifies a location of a centerline corresponding to a center of said distribution graph; and if said number of incremental steps is an even number, the data processing unit identifies a location of a lane boundary line corresponding to a center of said distributions graph.

\* \* \* \* \*

UNITED STATES PATENT AND TRADEMARK OFFICE
CERTIFICATE OF CORRECTION

PATENT NO.     : 6,850,841 B1
DATED          : February 1, 2005
INVENTOR(S)    : Roy Casino It is certified that error appears in the above-identified patent and that said Letters Patent is hereby corrected as shown below:

<u>Title page,</u>
Item [73], Assignee, please delete "Navtech North American, LLC", and insert
-- Navteq North America, LLC --.

Signed and Sealed this

Thirteenth Day of September, 2005

JON W. DUDAS
*Director of the United States Patent and Trademark Office*